R. B. OTWELL.
TRACTION WHEEL FENDER.
APPLICATION FILED AUG. 19, 1918.
1,363,669.
Patented Dec. 28, 1920.
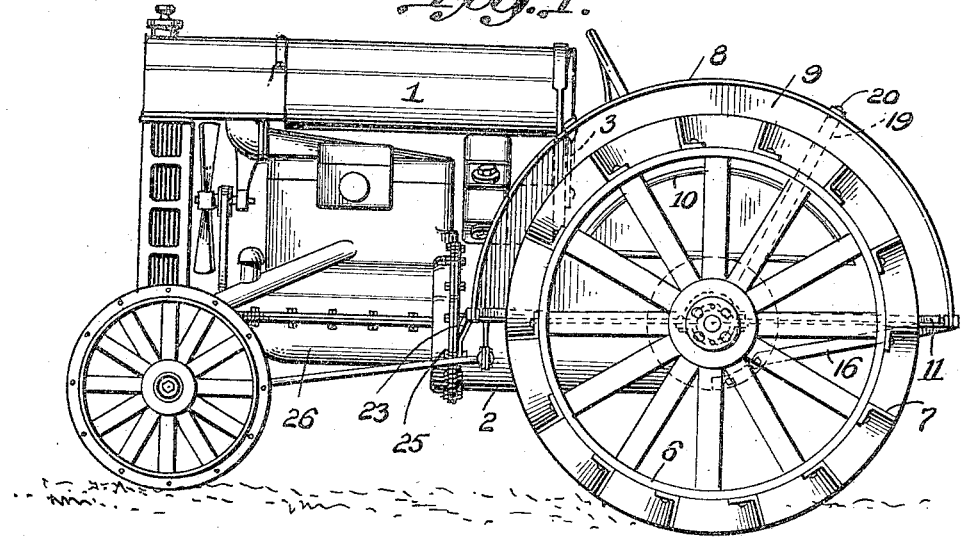
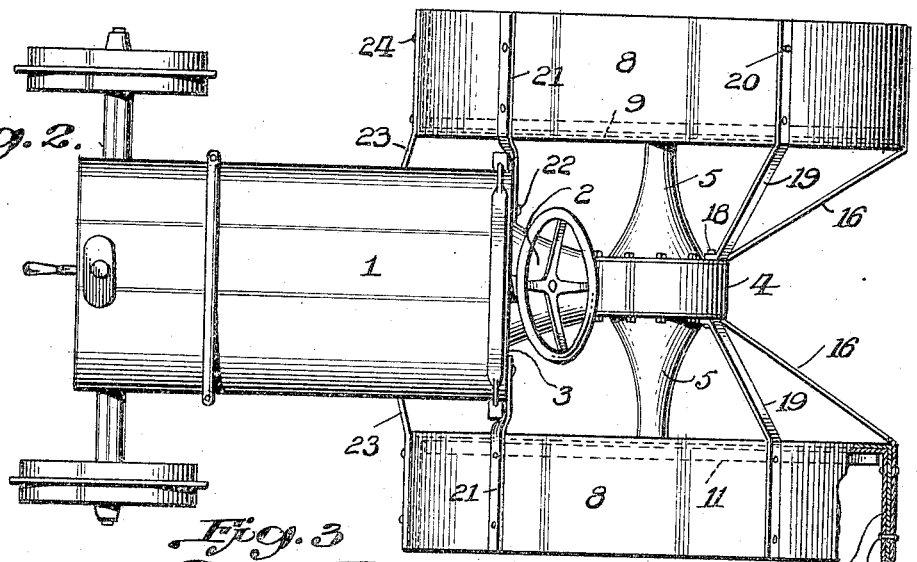
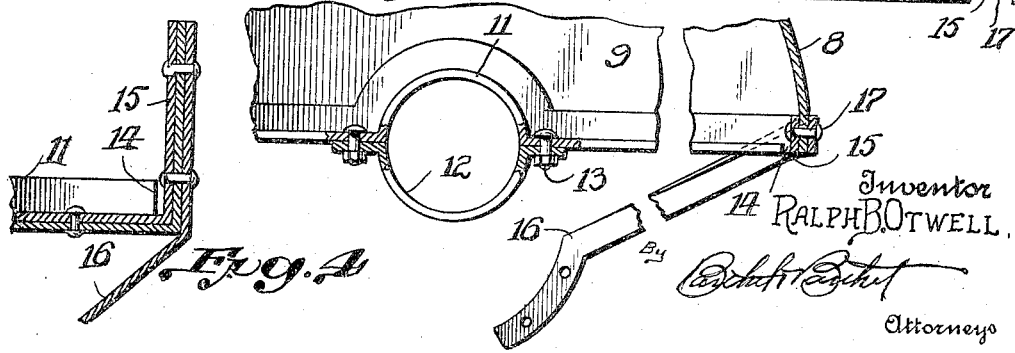
Inventor
RALPH B. OTWELL
Attorneys

UNITED STATES PATENT OFFICE.

RALPH B. OTWELL, OF DETROIT, MICHIGAN.

TRACTION-WHEEL FENDER.

1,363,669.  Specification of Letters Patent.  Patented Dec. 28, 1920.

Application filed August 19, 1918. Serial No. 250,440.

*To all whom it may concern:*

Be it known that I, RALPH B. OTWELL, a citizen of the United States of America, residing at Detroit, in the county of Wayne and State of Michigan, have invented certain new and useful Improvements in Traction-Wheel Fenders, of which the following is a specification, reference being had therein to the accompanying drawings.

In the operation of tractors, road machines and other vehicles having large traction wheels provided with tread members, spuds and anti-skidding devices, there is always danger of the operator of the machine having his clothes caught on the tread or spuds of the traction wheels and be drawn under the wheels either resulting in serious injury or death. Furthermore, operators often fall against the sharp spuds or tread members and serious accidents are known, all because the peripheries of the traction wheels have not been guarded or shielded to prevent the operators from contacting with the same.

My invention aims to furnish a tractor or similar vehicle with novel fenders that will positively prevent accident due to the spuds or tread members of the traction wheels of the vehicle. The fenders are constructed to positively guard the wheels, particularly from the position occupied by the operator of the tractor, and since such a tractor is often subjected to heavy duty work, the fenders have been constructed to withstand rough usage and considerable weight.

My invention further aims to provide fenders that may be easily and quickly installed, in connection with a well known type of farm tractor, the fenders having the supporting arms arranged for ready attachment to parts of the tractor so the fenders will be rigidly held.

My invention will be hereinafter specifically described and then claimed, and reference will now be had to the drawing, wherein Figure 1 is a side elevation of the well known type of farm tractor, provided with fenders in accordance with my invention;

Fig. 2 is a plan of the same, showing one of the fenders partly broken away and partly in section;

Fig. 3 is a longitudinal sectional view of a portion of one of the fenders, and

Fig. 4 is a horizontal sectional view of a portion of the fender.

In the drawing, the reference numeral 1 denotes a well known type of farm tractor having a transmission casing 2, a dash 3, a differential housing 4, rear axle housings 5, and driven traction wheels 6 on the outer ends of the housings 5. The traction wheels 6 have the peripheries thereof provided with spuds, tread members or anti-skidding devices 7 and it is these tread members that often cause serious injury to the operator of the tractor or persons contacting therewith.

The fenders are made of strong and durable sheet metal shaped to provide a guard or shield over the top of each traction wheel and at the inner side thereof, and each fender comprises a semi-cylindrical wall or cover 8 and a vertical semi-circular inner wall 9. The wall 9 may be provided with stiffening or reinforcing ribs 10 and the semi-circular edge of the wall 9 may be riveted, bolted or otherwise connected to the inner edge of the semi-cylindrical wall 8 and at the juncture of said wall there may be suitable flanges, carried by either wall, so that said walls will be rigidly held together.

The lower straight edge of the wall 9 is cut away to fit over the rear axle housing 5 and the straight edge of the wall 9 is reinforced by an angle bar 11, which intermediate the ends thereof, is shaped to fit over and rest on the outer end of the rear axle housing 5, as best shown in Fig. 3. The angle bar 11 affords support for a bottom strap 12 that may be bolted or otherwise connected to the angle bar 11, as indicated at 13, so as to coöperate with said angle bar in embracing the end of the rear axle housing 5, and thus holding the member in a defined relation relative to the rear axle housing.

The bar 11 has its ends extending to the ends of the semi-cylindrical wall 8, where said angle bar has its lateral flange cut away, as at 14, and its vertical flange bent outwardly as at 15, to extend along the end edges of the fender and thus provide a positive connection between the walls 8 and 9, particularly at the lower edges thereof.

With the fenders having the hub portions thereof mounted on the outer ends of the rear axle housings 5, a plurality of diverging or outwardly extending set of arms or brackets are used to prevent the fenders from swinging about the rear axle housings 5 and as additional supporting means for said fenders. The first set of arms is designated 16, said arms having the outer ends thereof connected to the rear ends of said fenders by rivets 17 or other fastening means; the ends of the arms extending transversely of the rear ends of the fenders, and the rivets 17 constituting fastening means that also hold the angle bar 11 at the rear ends of the fender, with the ends of the wall 8 sandwiched between the outer ends of the arms 16 and the ends of the angle bar 11, as best shown in Figs. 3 and 4. The inner ends of the arms 16 are connected to the outer rear axle housings 5 by the same fastening means 18 that secure the rear axle housings 5 to the differential housing 4.

The next set of arms is designated 19 and the outer ends of said arms extend across the walls 8 of the fenders and are riveted thereto, as at 20. The inner ends of the arms 19 are connected to the rear axle housings 5 by the fastening means 18.

Another set of arms is designated 21, and the outer ends of said arms are connected to the fenders, similar to the arm 19, while the inner ends of said arms are connected to the dash 2 by screw bolts 22 or other fastening means.

The forwardmost set of arms is designated 23, and these arms have the outer ends thereof connected to the forward ends of the fenders, as at 24, while the inner ends of said arms are held by the fastening means 25 which connects the transmission casing 2 to the power plant or crank case 26 of the tractor.

To install the fenders in connection with the type of tractor shown, it is not necessary to rearrange any part of the tractor and the dash 2 thereof can be easily provided with fastening means to hold the set of arms 21. With the fenders in position, the operator of the tractor, who will generally sit above the differential housing 4, is prevented from falling against the inner sides of the traction wheels, and even should the operator be thrown toward said wheels there is no danger of the clothing being torn on the tread members of the wheels, or the opertor carried under the wheels.

It is thought that the utility of the fenders will be apparent without further description, and while in the drawing there is illustrated a preferred embodiment of my invention, it is to be understood that the structural elements are susceptible to such variations and modifications as fall within the scope of the appended claims.

What I claim is:—

1. A fender for a traction wheel comprising a semi-cylindrical wall, a vertical semi-circular wall connected to said semi-cylindrical wall, and an angle bar on the straight edge of said semi-circular wall and having its lateral flange cut away at its end to provide clearance for the ends of said semi-cylindrical wall, and its vertical flange bent and secured to the ends of said semi-cylindrical wall.

2. The combination with a tractor having a transmission casing, a dash, a differential housing, rear axle housings, and traction wheels, of fenders over said traction wheels, and arms connected to said fenders and to the transmission casing, dash, and differential housing of said tractor.

3. The combination with a tractor having rear axle housings and traction wheels, of fenders over said wheels, means at the lower edges of said fenders embracing said rear axle housings and supporting said fenders relative thereto, and arms connecting said fenders to parts of said tractor.

4. The combination with a tractor having rear axle housings and traction wheels, of fenders over said wheels, and at the inner sides thereof, angle bars at the lower edges of said fenders extending over said rear axle housings, straps connected to said angle bars and extending under said rear axle housings, and a plurality of arms connecting each member to said tractor.

In testimony whereof I affix my signature in the presence of two witnesses.

RALPH B. OTWELL.

Witnesses:
 ANNA M. DORR,
 KARL H. BUTLER.